United States Patent [19]

Sanford

[11] Patent Number: 4,607,909
[45] Date of Patent: Aug. 26, 1986

[54] METHOD FOR MODULATING A CARRIER WAVE

[75] Inventor: Norman A. Sanford, Arlington, Mass.

[73] Assignee: Polaroid Corporation, Cambridge, Mass.

[21] Appl. No.: 620,619

[22] Filed: Jun. 14, 1984

[51] Int. Cl.$^4$ .............................................. G02B 6/10
[52] U.S. Cl. .................................................. 350/96.14
[58] Field of Search ................ 350/96.12, 96.13, 96.14

[56] References Cited

U.S. PATENT DOCUMENTS

| 3,795,433 | 3/1974 | Channin | 350/96.14 |
|---|---|---|---|
| 3,923,373 | 12/1975 | Dabby et al. | 350/96.14 |
| 3,923,374 | 12/1975 | Martin | 350/96.14 |
| 4,005,927 | 2/1977 | Caton | 350/96.14 |
| 4,058,722 | 11/1977 | Taylor | 350/96.14 |
| 4,111,523 | 9/1978 | Kaminow et al. | 350/96.14 |
| 4,288,785 | 9/1981 | Papuchon et al. | 340/347 |
| 4,340,272 | 7/1982 | Papuchon et al. | 350/96.14 |
| 4,396,246 | 8/1983 | Holman | 350/96.14 |
| 4,505,587 | 3/1985 | Haus et al. | 350/96.14 |
| 4,533,207 | 8/1985 | Alferness | 350/96.14 |

OTHER PUBLICATIONS

W. B. Spillman, Jr. et al, "Optical Waveguides in Li-TaO$_3$ Formed by Proton Exchange", Optics Letters, Sep. 1983, pp. 497–498.
R. V. Schmidt et al, "Efficient Optical Waveguide Switch/Amplitude Modulator", Optics Letters, Feb. 1978, pp. 45–47.
J. L. Jackel et al, "Proton Exchange for High-index Waveguides in LiNbO$_3$", Appl. Phys. Lett., Oct. 1982, pp. 607–608.
G. D. H. King et al, "Analogue-to-digital Conversion Using Integrated Electro-optic Interferometers", Electronics Letters, 9th Dec. 1982, pp. 1099–1100.

Primary Examiner—William L. Sikes
Assistant Examiner—Robert E. Wise
Attorney, Agent, or Firm—Francis J. Caufield

[57] ABSTRACT

A method for externally modulating an optical carrier wave by propagating the wave through a single channel waveguide structured to have an output whose optical power in the near field is distributed in a predetermined spatial pattern, selectively changing the optical power distribution pattern in correspondence with an information signal, and spatially filtering the power distribution pattern so that only the power available within selected region of the pattern is transmitted beyond the point of spatial filtering where it is available as an optical carrier wave whose intensity is modulated in correspondence with the information signal.

6 Claims, 7 Drawing Figures

METHOD FOR MODULATING A CARRIER WAVE

BACKGROUND OF THE INVENTION

This invention in general relates to optical communications and in particular to devices and methods for modulating electromagnetic carrier waves in the optical region of the spectrum.

To convey information on an optical wave, some property of that wave has to be modulated or changed in accordance with the information and adopted coding system. The wave property may be intensity, phase, frequency, polarization, or direction, and the modulation format can be either analog or digital.

Devices for modulating optical carrier waves are commonly classified as either direct or external modulators. With the direct modulator, the output of the carrier source, such as a semiconductor laser, is made to vary in accordance with changes in the injection current which typically serves as the electrical analog of the information signal. External modulators accept a source output as an input and then change some property of the source output for transmission along the fiber trunk line.

Well known in the art are external modulators which rely on the electro-optical or acousto-optical properties of crystalline birefringent materials such as lithium niobate ($LiNbO_3$) and lithium tantalate ($LiTaO_3$). Here, a light wave passing through a crystal exhibiting the electro-optic effect is divided into an ordinary and an extraordinary wave by appropriate choice of the direction of polarization. These waves travel with different velocities. When a voltage is appled to the crystal, the velocities of the waves change, and intensity modulation can be produced by using the resulting phase difference.

In a typical modulator based on this scheme, the output of a laser is linearly polarized and arranged to make an angle of 45° with the electrically induced birefringent axes of the electro-optic crystal. A voltage applied to the crystal then changes the propagation velocities of the ordinary and extraordinary rays causing the output from the crystal to be elliptically polarized. Variations in the modulating voltage thus cause corresponding changes in the output when the output is made to pass through an analyzer and thus the transmitted power from the analyzer also changes. A quarter-wave plate is often inserted in the sysem to bias it to give optimum linearity to the modular characteristic.

Waveguide modulators utilizing this scheme are also known with the waveguide taking on the function of the electro-optic crystal. In one type of known waveguide modulator, the amount of coupling between two waveguides is changed by applying a modulating voltage. However, all of the known waveguides rely on relatively complex interferometric schemes to produce intensity modulation as their output. Thus, it is a primary object of the present invention to provide a simplified waveguide modulator and method for using it to provide intensity modulation of an optical carrier wave.

Other objects of the invention will, in part, be obvious and will, in part, appear hereinafter. The invention, accordingly, comprises methods and use of the apparatus possessing the construction, combination of elements, and arrangement of parts exemplified in the detailed disclosure which follows.

SUMMARY OF THE INVENTION

This invention in general relates to methods and devices for modulating electromagnetic carrier waves in the optical region of the spectrum and in particular to a method for externally modulating an optical carrier wave by propagating the wave through a single channel waveguide structured to produce an output whose optical power in the near field is distributed in a predetermined pattern, selectively changing the optical power distribution pattern in correspondence with an information signal, and spatially filtering the power distribution pattern so that only the power available within a selected region of the pattern is transmitted beyond the point of spatial filtering where it becomes available as an optical carrier wave whose intensity is modulated in correspondence with the information signal.

An inventive modulator used in the method comprises a waveguide having a single channel formed in a ferroelectric substrate through an ion-proton exchange process. The substrate is preferably an x-cut crystal of lithium niobate, but may be lithium tantalate, and with either material can also be z-cut.

In the preferred embodiment of this modulator, the single channel is formed in the crystalline substrate by immersing a properly masked substrate in a bath of hot benzoic acid. The mask is defined by metallic strips which afterwards double as electrodes without additional processing after the benzoic acid proton exchange bath.

When the waveguide is endfire coupled, it supports one or more propagation modes polarized or copolarized in one azimuth either parallel to or perpendicular to the y-z plane, and along either the y-axis or the x-axis of the crystal. Application of a variable voltage across the electrodes of the waveguide causes a predictable change in the near field energy distribution of the coupled copolarized modes. Spacial filtering is provided in a predetermined near field location to selectively block part of the energy distribution from traveling further downstream while the remaining part of the distribution is used as a modulated signal which can be detected by a suitably placed photodetector.

DESCRIPTION OF THE DRAWINGS

The novel features that are considered characteristic of the invention are set forth with particularity in the appended claims. The invention itself, however, both as to its organization and method of operation, together with other objects and advantages thereof, will best be understood from the following detailed description of the illustrated embodiment and steps when read in connection with the accompanying drawings wherein like numbers have been employed in the different figures to denote the same parts and wherein:

DETAILED DESCRIPTION

This invention relates to a method and device for externally modulating at high rates electromagnetic carrier waves in the optical region of the spectrum ranging in wavelength from the visible through the near infrared. The device used in the method comprises a waveguide having a single channel capable of supporting the propagation of either a perferentially polarized single mode or preferentially copolarized multimodes in such a way that the power intensity distribution of the propagating modes at the near field output location of the waveguide can be selectively changed in a controllable way by a voltage applied across the waveguide channel and afterwards spatially filtered to provide an intensity modulated output signal useful for conveying information along optical fiber.

Figure 1:
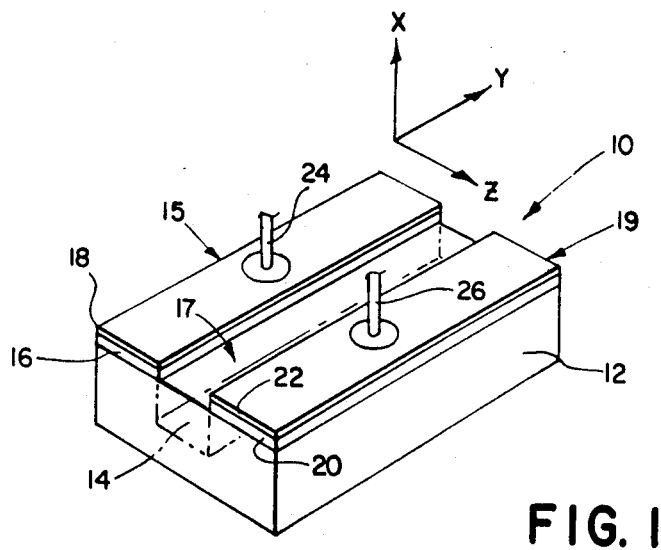
FIG. 1 is a diagrammatic perspective view of a single channel waveguide which is used in this invention.

The waveguide portion of the modulator is shown diagamatically at 10 in FIG. 1 where it can be seen to comprise a generally parallelepiped-shaped, thin, planar substrate 12 having formed therein in a manner to be described a single elongate channel 14 whose index of refraction in one azimuth is higher than that of the substrate 12 in the same azimuth.

On the upper side of the substrate 12 and straddling the channel 14 are a pair of electrodes 15 and 18 with attached leads 24 and 26, respectively.

Substrate 12 is formed of a ferroelectric birefringent crystalline material preferably lithium niobate (LiNbO$_3$), but it can also be of lithium tantalate (LiTaO$_3$) or other suitable material having similar properties.

The preferred crystalline orientation for the substrate 12 is indicated in FIG. 1 with the z-axis of the crystallographic x-y-z coordinate system coincident with the optic axis or "c"-axis of the crystalline structure of the substrate material. With this orientation, it will be understood that the preferred substrate is x-cut and thus y-propagating, although it may alternatively be z-cut for reasons which will come later.

The exact size for the substrate 12 will, of course, depend on the particular application but, in general, will be the scale of several millimeters in length and width and perhaps a millimeter or so in depth. Actual substrates used in practice were approximately 10 millimeters in length, 5 millimeters in width and one millimeter in depth.

The geometry of the channel 14 and its optical properties are selected in a well-known manner to support either single or multimode propagation, depending upon the adopted usage of the waveguide 12, and then the channel 14 is formed or reformed as necessary in the substrate 12 in the following way.

The electrodes 15 and 19 are formed on the surface as layers of metallic composition. First laid down are layers 16 and 20 which are preferably of chromium (Cr) and approximately 200 Angstroms thick. Layers 16 and 20 are followed by layers of gold (Au) which are approximately 700 Angstroms thick. Leads 24 and 26 are attached to the gold layers, 18 and 20, respectively, in a well-known manner. Chromium is first coated to the substrate because of its good adhesion properties with both gold and lithium niobate or lithium tantalate, and gold is used, of course, because it is an excellent conductor. In addition, chromium and gold are materials of choice for forming the electrodes 15 and 19 because these materials are also resistant to degradation in the presence of other materials to which they are exposed in the subsequent steps for forming the waveguide 10, a general requirement for the electrodes, 15 and 19, of whatever composition.

The long inboard edges of the electrodes, 15 and 19, define between them a rectangular aperture 17 which exposes a well-defined area of the substrate material coincident with the top channel geometry (14) for further treatment. In this manner, the electrodes, 15 and 19, also provide a masking function.

The unprotected part of the substrate 12 in the y-z plane is emmersed in a hot melt of benzoic acid ($C_6H_5COOH$) or other hydrogen rich acid such as sulfuric acid ($H_2SO_4$). When emmersed in the benzoic acid, the unprotected region of the lithium niobate or lithium tantalate substrate exchanges lithium ions for free protons which are supplied by the acid. The result of this is an increase in the the extraordinary index of refraction, the index in the y-z plane of the substrate 12. The amount of index change and the effective depth both in the x-direction and the z-direction of the guiding channel 14 depend in a well-known manner on the acid temperature and the exposure time. By this is meant that the diffusion proceeds in two directions and not necessarily at the same rate.

In the foregoing simple manner, the waveguide 10 is fabricated quite easily with a metallic masking function used to define the waveguiding region serving also as an electrode pattern without any additional processing.

The waveguide 10 structured in this way is used to propagate only waves whose polarization azimuth is parallel to the y-z plane in FIG. 1 whether of single or multimode character.

Typical index changes in this plane are up to 0.12 for lithium niobate and 0.14 for lithium tantalate from the substrate base material index of refraction which for both materials is approximately 2.2. Moreover, the electro-optic coefficient in this direction is usually largest for these substrate materials and this is another reason for the adopted preferred orientation.

As mentioned earlier, the waveguide 10 can be made to support either single mode or multimode propagation and in the multimode case, the modes supported are the quasi-transverse electric modes for x- and z-cut crystalline materials. Quasi here is meant that the modes are primarily polarized along one direction, but not exactly so.

Figure 2:
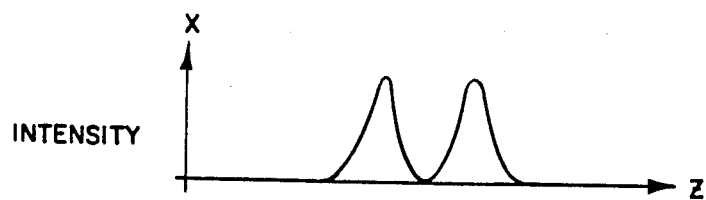
FIG. 2 is a graph illustrating one possible near field modal power distribution for an excited state of the waveguide of FIG. 1.
Figure 3:
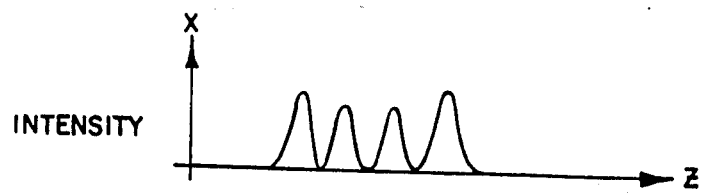
FIG. 3 is similar to FIG. 2 but illustrates the near field modal power distribution for another possible waveguide output.

Some typical power distribution, depending on waveguide properties, for multimode propagation with no applied voltage across the leads 24 and 26 are given in FIGS. 2 and 3. These graphs represent the spatial power distribution in the near field of the channel 14, i.e., a location close to the exit port of the channel 14. As can be seen in those graphs, the power intensity peaks more than once across the width of the channel 14, and the number of peaks depends on the order of the mode. Here, FIG. 2, having 2 peaks is of lower order than FIG. 3.

Since channel 14 supports the propagation only of waves polarized in one azimuth, the modes propagating of whatever order adopted are copolarized, have spatially distributed power patterns and are believed to be weakly coupled.

Figure 4:
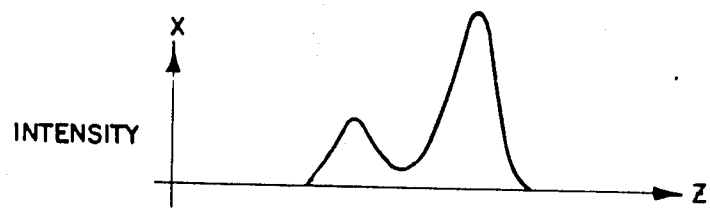
FIG. 4 is a graph illustrating the change to the near field modal power distribution of FIG. 2 when the electrodes of the waveguide of FIG. 1 have a voltage applied to them.
Figure 5:
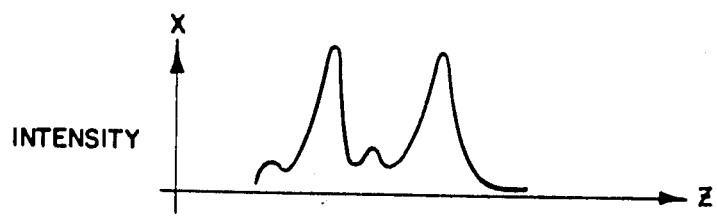
FIG. 5 is a graph showing the change in the near field modal power distribution of FIG. 3 in response to a voltage applied to a waveguide of the invention.

It has been found that, even with the application of but modest voltages across the leads 24 and 26, it is possible to change the near field power distribution patterns of the propagation modes such that power from one or more modes is coupled into other modes, thereby making available in the near field predictable patterns which are exploitable for intensity modulation purposes. Such changed patterns are shown in FIGS. 4 and 5; FIG. 4 corresponding to a change in the FIG. 1 pattern and FIG. 5 to a change in the FIG. 3 pattern.

Figure 6:
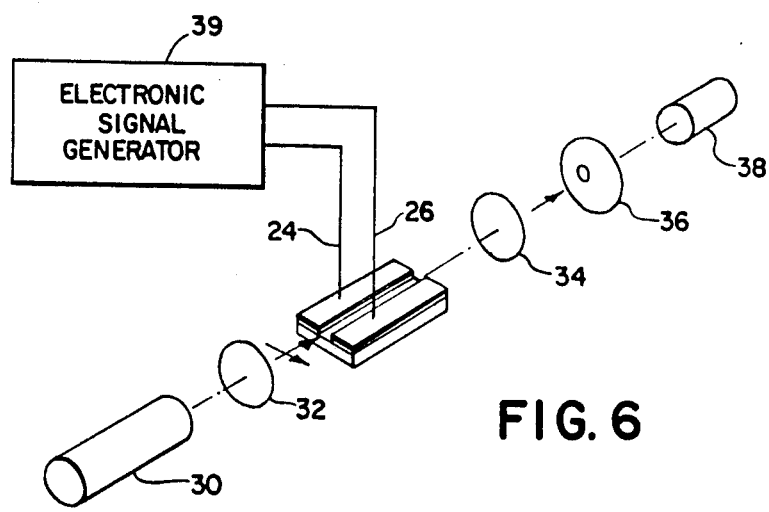
FIG. 6 is an enlarged diagrammatic perspective view illustrating other components used to practice the invention.

With this in mind, reference is now made to FIG. 6 where the waveguide 10 is shown in combination with other components which comprise a coherent source 30, such as a semiconductor laser, which is endfire coupled to the waveguide 10 via bulk optics indicated schematically at 32. The near field output from the waveguide channel 14 is imaged via schematically indicated bulk optics 34 onto an aperture plate 36 which serves as a means for spatially limiting only a selected part of the near field output pattern from the waveguide 10 for further transmission to a photodetector 38 which operates in the usual way to convert light signals to electrical form.

An electronic signal generator 38 is connected across the waveguide leads, 24 and 26, to provide the necessary information signal, and the level of voltage provided by the signal generator 39 preferably does not exceed that above which the electro-optic effect for the substrate material becomes nonlinear. The voltage from the generator 39 operates to generate the electro-optic effect of the substrate 12 which, in turn, causes changes in the waveguide optical power distribution.

Modulation rates in excess of video rates for a channel width of 9 micrometers, acid bath time of 5 minutes near 249° C., and at wavelengths ranging from the visible to 1.32 micrometers have been easily achieved. Furthermore, it is believed that the bulk electro-optic properties of the substrate materials is such that the response of the substrate is so fast that the modulation rate possible is limited by available electronic signal generator capability.

Instead of using a discrete spatial filter such as 36 shown in FIG. 6, it will be recognized that spatial filtering can also easily be achieved by butt coupling an optical fiber or fibers of suitable structure at the appropriate transverse location of the channel 14 to obtain an intensity modulated signal directly coupled into fiber which may, for example, be a trunk line.

Figure 7:
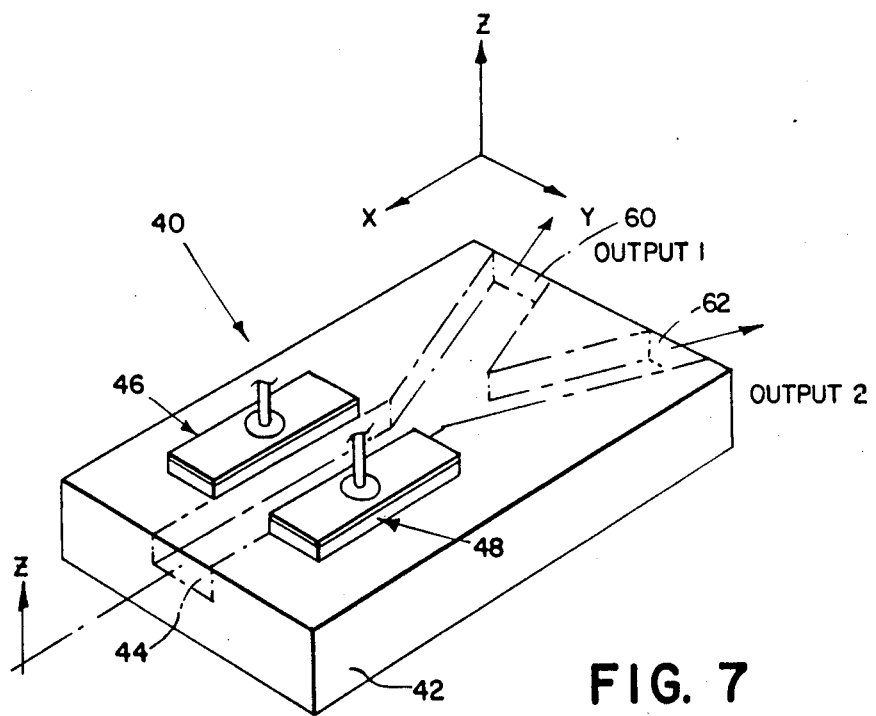
FIG. 7 is an enlarged diagrammatic perspective view illustrating an alternate embodiment which may be used to practice the invention.

Because the ion-proton exchange process is active in raising only the extraordinary index of refraction of the substrate material, other devices with curved or branch channels are possible with but little extra care in masking and electrode geometry placement. However, curved or branched versions of the device require a z-cut material orientation such as that shown for the device indicated at 40 in FIG. 7. Device 40 is again a waveguide comprising a substrate 42, preferably of lithium niobate, having a waveguide channel which begins at 44 and branches to 60 and 62 which serve as exit ports. Again, layered electrodes are provided on both sides of the channel branch 44 as shown at 46 and 48. With this waveguide, the polarization azimuth for propagating waves is parallel to the x-z plane, while propagation is in the direction of the x-axis. Here, two outputs are possible, and the spatial filtering is achieved by proper design of the branching configuration.

Although lithium niobate is the preferred material for fabricating the devices used, lithium tantalate can be beneficially used as it also exhibits the effects required. However, lithium tantalate doesn't form waveguide channels readily with only the ion-proton exchange process. In addition, annealing at high temperatures must follow the proton exchange process to obtain suitable waveguides with this material.

Those skilled in the art may make other changes to the above-described embodiments without departing from the scope of the invention. For example, it is possible to provide great variations in index profiles from extremes of graded index to nearly uniform profiles in the waveguide channels to obtain beneficial optical power patterns other than those illustrated. This is easily accomplished with known techniques for buffering benzoic acid to control the ion-proton exchange distribution across the channel both in width and depth to influence the modal characteristics propagated.

In addition, the essential results can be enhanced or changed by replacing the electrodes used to define the channel with other geometries placed relative to the waveguide region.

Also, devices like these need not necessarily be confined to x or z-cut material. y-cut materials may be used advantageously depending on the application but may require slightly different processing to fully exploit their efficient use.

Therefore, it is intended that all matter contained in the above description or shown in the accompanying drawings shall be interpreted as illustrative and not in a limiting sense.

What is claimed is:

1. A method for modulating electromagnetic carrier waves in the optical region of the spectrum comprising the steps of:
propagating the carrier wave through a ferroelectric waveguide as a plurality of modes copolarized in one azimuth such that the optical power emerging from the waveguide in the near field is spatially distributed in a predetermined pattern containing spatially separated intensity peaks;
selectively changing said optical power distribution pattern in correspondence with an information signal by interfering and cross coupling energy between said modes; and
spatially filtering said near field optical distribution pattern so that only the optical power in a predetermined region of said pattern is transmitted beyond the point of spatial filtering to provide an optical carrier wave whose intensity is modulated in correspondence with the information signal.

2. The method of claim 1 wherein said optical power distribution pattern is selectively redistributed to increase the magnitude of the intensity of selected ones of said intensity peaks while lowering the intensity of the other peaks.

3. The method of claim 1 wherein said optical power distribution pattern is selectively changed by applying across the waveguide an electric field which varies in correspondence with the information signal and operates to change the electro-optic properties of the waveguide to change said optical power distribution pattern.

4. The method of claim 1 wherein said near field optical distribution pattern is spatially filtered by imaging it onto an aperture stop capable of transmitting only said region of said pattern.

5. The method of claim 1 wherein said near field optical distribution pattern is spatially filtered by butt coupling an optical fiber to said waveguide so that only part of said pattern is transmitted along said fiber.

6. The method of claim 1 wherein said carrier wave mode is propagated along a waveguide comprising a planar substrate consisting essentially of lithium niobate ($LiNbO_3$) or lithium tantalate ($LiTaO_3$) having formed therein a channel of higher index of refraction than that of said substrate material along one crystallographic axis thereof.

* * * * *